United States Patent [19]

Hashimoto et al.

[11] Patent Number: 4,834,806

[45] Date of Patent: May 30, 1989

[54] CORROSION-RESISTANT STRUCTURE COMPRISING A METALLIC SURFACE AND AN AMORPHOUS ALLOYS SURFACE BONDED THEREUPON

[75] Inventors: Koji Hashimoto, Izumi; Hideaki Yoshioka, Sendai; Katsuhiko Asami, Sendai; Asahi Kawashima, Sendai, all of Japan

[73] Assignee: Yoshida Kogyo K. K., Tokyo, Japan

[21] Appl. No.: 98,391

[22] Filed: Sep. 18, 1987

[30] Foreign Application Priority Data

Sep. 19, 1986 [JP] Japan .................. 61-219166

[51] Int. Cl.[4] .................. C23C 6/02; B23K 15/00; C22C 1/02
[52] U.S. Cl. .................. 148/4; 148/403; 420/79; 420/441
[58] Field of Search .................. 148/4, 403; 420/441, 420/79

[56] References Cited

U.S. PATENT DOCUMENTS

| 4,260,416 | 4/1981 | Kavesh et al. .................. 148/403 |
| 4,473,401 | 9/1984 | Masumoto et al. .................. 148/403 |
| 4,517,017 | 5/1985 | Inomata et al. .................. 148/403 |
| 4,612,059 | 9/1986 | Mori et al. .................. 148/4 |

FOREIGN PATENT DOCUMENTS

| 57-155363 | 9/1982 | Japan . |
| 59-50745 | 12/1984 | Japan . |
| 60-238489 | 11/1985 | Japan . |

*Primary Examiner*—Upendra Roy
*Attorney, Agent, or Firm*—Hill, Van Santen, Steadman & Simpson

[57] ABSTRACT

A corrosion-resistant amorphous surface alloy is disclosed which is 150 μm or less thick and bonded onto a substrate crystalline metal or alloy and processed by irradiation of high energy density beam, such alloy being composed of 8–19 at % Cr, 17–22 at % in the sum of P and 2–7 at % B, and the remainder being Ni, Ni—Co containing Co in an atomoic ratio of Co/Ni of ⅔ or less, or Ni—Fe or Ni—Co—Fe containing Fe in an atomic ratio of Fe/Ni or Fe/Ni+Co of 1/5 or less. Also disclosed is a process for producing such alloy.

5 Claims, 13 Drawing Sheets

CORROSION-RESISTANT STRUCTURE COMPRISING A METALLIC SURFACE AND AN AMORPHOUS ALLOYS SURFACE BONDED THEREUPON

BACKGROUND OF THE INVENTION

1. Field of the Invention

The present invention relates to corrosion-resistant amorphous surface alloys applied onto inexpensive and less corrosion-resistant substrate metallic materials, and also to a process for their preparation. Such surface alloys are suitable for corrosion-resistant materials in extremely aggressive environments such as strong acids including hydrochloric acid in which conventional corrosion-resistant metallic materials such as stainless steels and corrosion resistant nickel alloys induce severe corrosion.

2. Prior Art

Conventional corrosion-resistant iron-base and nickel-base alloys such as Type 304 and Type 316 steels, Carpenter-20, Inconel 600 and Hastelloy C possess excellent corrosion resistance and have been used widely in corrosive environments including chemical plants and the like. However, stainless steels of not high contents of nickel, such as Type 304 and Type 316 steels, even if added with molybdenum suffer pitting and crevice corrosion in aggressive environments containing halogen ions and hence are used in relatively mildly corrosive environments. This problem is also serious in terms of safety and economy as even high nickel alloys including Inconel 600 suffer pitting, crevice corrosion and wall thinning due to general corrosion in aggressive corrosive environments.

Usually, solid alloys are in a crystalline state. However, if a specifically composed alloy is solidified as by rapid quenching from its liquid state, by which the formation of the long range order in atomic arrangement is prevented, an alloy of an amorphous structure similar to the liquid structure can be obtained which is called an amorphous alloy. Most amorphous alloys are homogeneous, single-phase alloys of supersaturated solid solutions. These alloys therefore have remarkably high mechanical strength compared with conventional practical metals and also extraordinarily high corrosion resistance and various other unique characteristics depending on the chemical compositions. The present inventors have studied corrosion-resistant amorphous alloys of such characteristics and have found certain corrosion-resistant amorphous alloys unsusceptible to pitting, crevice and general corrosion in highly aggressive aqueous solutions such as of strong acids and solutions containing high concentrations of chloride ions (Japanese Patent Publication No. 59-50745).

This invention consists of the following: (1) a corrosion-resistant amorphous alloy composed of 5–40 at % Cr and 15–35 at % P and the reminder being Ni, unsusceptible to pitting crevice and general corrosion in aggressively corrosive environments, (2) a corrosion-resistant amorphous alloy composed of 5–40 at % Cr, 15–35 at % P and at least one element selected from 3 at % or less Al, 10 at % or less Mo and less than 40 at % Fe, and the remainder being Ni and the sum of Cr, P, Al, Mo and Fe being less than 60 at %, unsusceptible to pitting, crevice and general corrosion in aggressively corrosive environments, (3) a corrosion-resistant amorphous alloy composed of 5–40 at % Cr, 15–35 at % in the sum of 5–35 at % P and at least one element selected from C, Si and B, and the remainder being Ni, unsusceptible to pitting, crevice and general corrosion in aggressively corrosive environments, and (4) a corrosion-resistant amorphous alloy composed of 5–40 at % Cr, 15–35 at % in the sum of 5–35 at % P and at least one element selected from C, Si and B and at least one element selected from 3 at % or less Al, 10 at % or less Mo and less than 40 at % Fe, and the remainder being Ni, the sum of Cr, P, C, Si, B, Al, Mo and Fe being less than 60 at %, unsusceptible to pitting, crevice and general corrosion in aggressively corrosion environments.

However, as will be described later, the amorphous alloys if prepared by rapid quenching from their liquid state are generally in the form of thin sheet of 200 $\mu$m or less because of requirement of rapid absorption of heat of melt. Furthermore, conventional welding methods cannot be applied to them. These facts restrict their practical utilization.

On the other hand, some of the present inventors have previously found that if a metal surface is irradiated with a high energy density beam for a short time for instantaneous melting of a limited volume, the heat of the molten portion is rapidly absorbed by the surrounding solid metal and that this phenomenon can be used to prepare a rapidly solidified amorphous surface alloy onto conventional bulk metals (Japanese Patent Laid-open Publication Nos. 57-155363 and 60-238489).

Certain corrosion-resistant amorphous nickel-base alloys are known as having high corrosion resistance in aggressive environments, but have not so far been used practically. The thickness of amorphous alloys prepared by rapid quenching from the liquid state is generally 10 $\mu$m, at most 200 $\mu$m, owing to the need to rapidly absorb heat from the melt. Furthermore, the amorphous alloys are thermodynamically metastable and lose their inherent characteristics by crystallization when heated at temperatures higher than the crystallization temperatures, precluding the use of conventional welding methods which require alloys to be heated. The fact that thin amorphous alloys of several tens of microns cannot be welded conventionally is the most serious problem preventing practical utilization of corrosion-resistance amorphous nickel-base alloys.

On the other hand, the extremely high corrosion resistance of corrosion-resistant amorphous nickel-base alloys is required not for bulk structural materials but for the material surface.

SUMMARY OF THE INVENTION

The present invention aims to remove the restriction of thickness limitation and unweldability by processing corrosion-resistant amorphous alloys as the surface alloys onto conventional bulk metallic materials.

Though a study of the characteristics and processing techniques of amorphous alloys, the present inventors have found that transformation of a wide metal surface to its amorphous alloy by irradiation treatment of a high energy density beam, overlapped irradiation of a high energy density beam needs to be repeatedly applied onto a part of the previously vitrified phase and that irradiation of high energy density beam is the most difficult method of preparing amorphous alloys which are thermodynamically metastable and hence readily crystallized by heating. The present inventors have made further studies on this knowledge and have found that among the alloys disclosed in Japanese Patent Publication No. 59-50745, the alloys of the invention can form amorphous surface alloys of extremely high corrosion resistance onto various conventional metallic materials by high energy density beam processing. Thus the present invention has been achieved.

DETAILED DESCRIPTION

Figure 1:
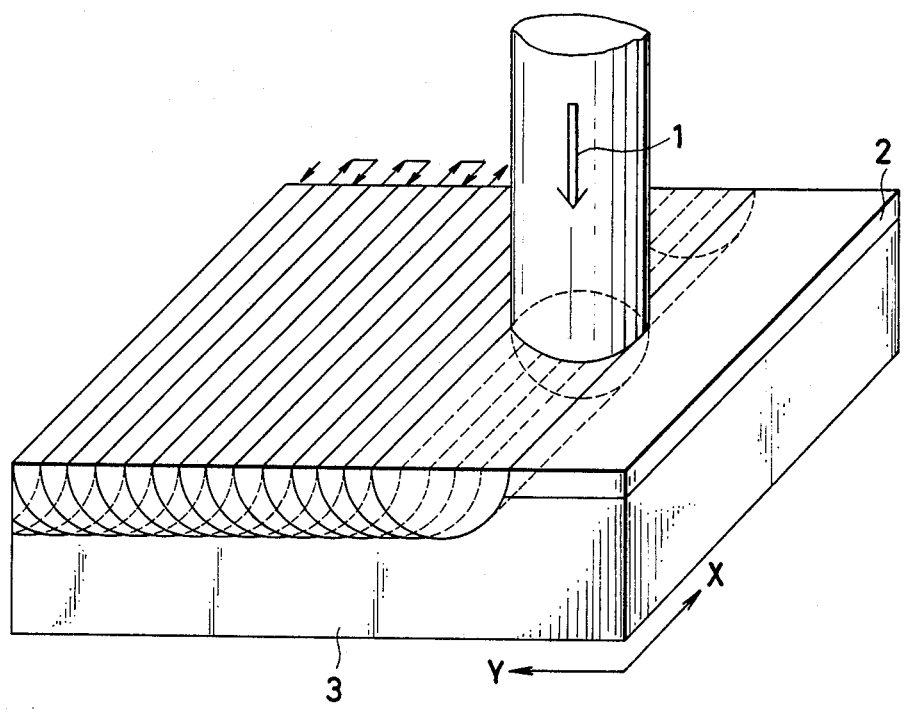
FIG. 1 is a schematic view showing laser beam irradiation as a representative example of the high energy density beam irradiation treatment of the invention.

An alloy according to the invention is characterized in that the amorphous surface alloy of 150 μm or less thickness comprises 8-19 at % of Cr and 17-22 at % in the sum of P and 2-7 at % of B, the remaining amount being of Ni, Ni-Co where the atomic ratio of Co/Ni is ⅔ or less, or Ni—Fe or Ni—Co—Fe where the atomic ratio of Fe/Ni or Fe/Ni+Co is 1/5 or less, bonded onto a conventional crystalline substrate metal or alloy and prepared by high energy density beam processing.

Another alloy of the invention is one in which Cr in the just mentioned alloy is replaced with Mo—Cr in an atomic ratio of Mo/Cr of up to 1.

In the practice of the invention, Cr is essential to provide high corrosion resistance.

Mo, P and B form amorphous structures with Ni, Ni—Co, Ni—Fe or Ni—Co—Fe, the latter two containing Fe in an atomic ratio of Fe/Ni or Fe/Ni+Co of 1/5 or less, by rapid quenching from their liquid state.

It is not necessary for alloys to contain both P and B for vitrification by conventional rapid solidification methods such as melt spinning. However, alloys containing only one of P and B cannot be vitrified by high energy density beam processing. The alloys of the invention essentially comprise both P and B.

Ni, Ni—Co, Ni—Fe and Ni—Co—Fe, the latter two being in an atomic ratio of Fe/Ni or Fe/Ni+Co of 1/5 or less, is the balance in the alloys of the invention and forms amorphous structures when P and B coexist.

The upper and lower concentration limits of the alloy constituents useful in the invention are those in which amorphous surface alloys can be formed, by high energy density beam processing later described, starting from crystalline alloy layers or layers bonded to conventional crystalline substrate metallic materials.

The invention is also directed to a process for preparing the corrosion-resistant amorphous surface alloys. This process may be effected for example in such a manner that high energy density beam is irradiated to a specimen consisting of a metal or alloy of a prescribed composition tightly bonded to a conventional crystalline substrate metal or alloy, once or several times during movement of the specimen or beam to control the irradiation energy density and melting time respectively, to 5000 J/cm$^2$ or less and $5 \times 10^{-3}$ sec or shorter and further to control the product of the irradiation energy density and melting time to 5 J sec/cm$^2$ or less. By this procedure the thickness of the processed surface layer is limited to 150 μm or less and becomes homogeneous. The procedure avoids excess heating of the melt and hence leads to rapid quenching of the melt. Consequently the corrosion-resistant amorphous surface alloys of the invention can be prepared on conventional crystalline bulk substrates.

Specimens to be irradiated by the high energy density beam may be prepared by a variety of methods and include for instance a specimen consisting of a mild steel substrate electrodeposited with Ni—P, Ni—B, Cr and Ni—Mo and heat-treated to bond the electro-deposited layers so that its composition and thickness are as specified in the invention, a specimen prepared by melting and solidification of alloy sheets having the same compositions as specified in the invention on a crystalline substrate, and a specimen prepared by melt spraying the alloy of the invention onto a substrate.

During the preparation of the specimen, a portion of the substrate metallic material may be dissolved into the surface layer but in an extent not to interfere with vitrification of the surface alloy by the high energy density beam processing.

The thicknesses of the crystalline surface metal layers including the substrate are determined such that the average compositions of the surface alloys are as specified above.

FIG. 1 shows a representative example of high energy density beam irradiation processing for preparing the amorphous surface alloy of the invention. A sample consisting of a surface metal or alloy 2 tightly bonded to a substrate metal 3 is mounted on an X—Y work table and reciprocated in the X-direction during irradiation of laser beam 1. On its turn during each one-way motion in the X-direction, the specimen is moved in the Y-direction by a predetermined distance, whereby the entire surface is irradiated by the laser beam 1. The heat of the molten portion is mainly absorbed into the underlying solid phase, resulting in rapid quenching of the molten phase.

The control of irradiation energy density and irradiation time of the high energy density beam governs the extent of the substrate metal 3 being dissolved into a surface alloy to be formed, the composition of the resulting surface alloy and also rapid quenching of the melt. Excess melting deviates the composition of the molten portion from that vitrifiable by rapid quenching. Excess heat input leads to overheated solid metal around the molten portion, preventing rapid quenching of the molten portion and to crystallization of a portion of previously vitrified phase. Therefore, the laser irradiation should form a vitrifiable melt of 150 μm or less depth. To assure rapid quenching, the irradiation energy density and irradiation time of the high energy density beam to each portion should be controlled to be 5000 J/cm$^2$ or less and $5 \times 10^{-3}$ sec or shorter, respectively, and the product of the irradiation energy density and irradiation time of high energy density beam should be 5 J sec/cm$^2$ or less.

If irradiation of high energy density beam is insufficient for the homogeneous mixing of multiple layers or layers combined with a portion of the substrate metal for vitrification by rapid quenching, repeated irradiation of high energy density beam is needed to complete alloying and homogenization of the surface alloy. If homogenization is insufficient, the melting point is generally high, and absorption of high energy density beam is difficult. In such instance, increased and repeated irradiation of high energy density beam, exceeding 5 J sec/cm$^2$, is effective for homogenizing the surface alloy, and subsequent vitrification at 5 J sec/cm$^2$ or lower product of energy density and melting time leads to the formation of an amorphous surface alloy. Sufficient homogenization leads to decreased melting point and improved absorption of high energy density beam, and subsequent treatment at lower energy density for shorter irradiation time gives a vitrified amorphous alloy. If the melting point of a substrate metal is much higher than that of a covering metal, the covering metal is evaporated during melt homogenization of the covering layer and the substrate, and therefore extra covering is required to compensate for evaporation loss.

The high corrosion resistance of metallic materials is attained when they contain a sufficient amount of elements capable of forming a protective film (passive film) stable in corrosive environments and are homogeneous to assure the formation of uniform passive film. However, conventional crystalline alloys include chemically heterogeneous multiple phases with different properties and fail to give corrosion-resistant characteristics. In the amorphous surface alloys of the invention formed by melting, mixing and self-quenching, the elements contained in the covering layers and substrates are homogeneously distributed. The surface alloys of the invention are homogeneous single-phase alloys as a result of rapid solidification which prevents localization of alloy constituents, and hence possess extremely high corrosion resistance.

The present invention will now be described by way of the following examples.

EXAMPLE 1

An alloy ingot was prepared by induction melting of prescribed amounts of nickel phosphide, electrolytic nickel, electrolytic chromium and boron crystal in argon atmosphere. The ingot was used to prepare a ribbon-shaped Ni-15at % Cr-16at % P-4at % B alloy of 40 $\mu$m thickness and 6 mm width. The ribbon-shaped alloy was spot-welded to a mild steel sheet of 50 mm length, 10 mm width and 3.2 mm thickness. The steel sheet was heat-treated in a vacuum and quenched in a diffusion pump oil in vacuum. By such treatment, the surface alloy was melted dissolving a portion of the substrate metal, giving a specimen to be irradiated consisting of a crystalline surface alloy bonded onto the mild steel.

The specimen was mounted on an X—Y work table reciprocating in the X-direction and was irradiated with a continuous $CO_2$ laser beam of 400 W in output and 200 $\mu$m in beam diameter. The irradiation beam density was 781.25 J/cm$^2$, and the melting time was $6.25 \times 10^{-4}$ sec. On its turn during each one-way motion in the X-direction, the specimen was moved in the Y-direction by 50 $\mu$m. A cycle of treatment was effected under the same conditions except for lateral inching movement of 125 $\mu$m in Y-direction. Two cycles of such treatment provided an amorphous surface alloy on the mild steel substrate.

A portion of the specimen was cut out, polished with silicon carbide paper and buffed, and measured for the average thickness of the amorphous surface alloy layer using an optical microscope and a scanning electron microscope. The average thickness was found to be 20 $\mu$m. X-ray microanalysis revealed that the amorphous surface alloy contained about 4 at % of Fe.

Figure 2:
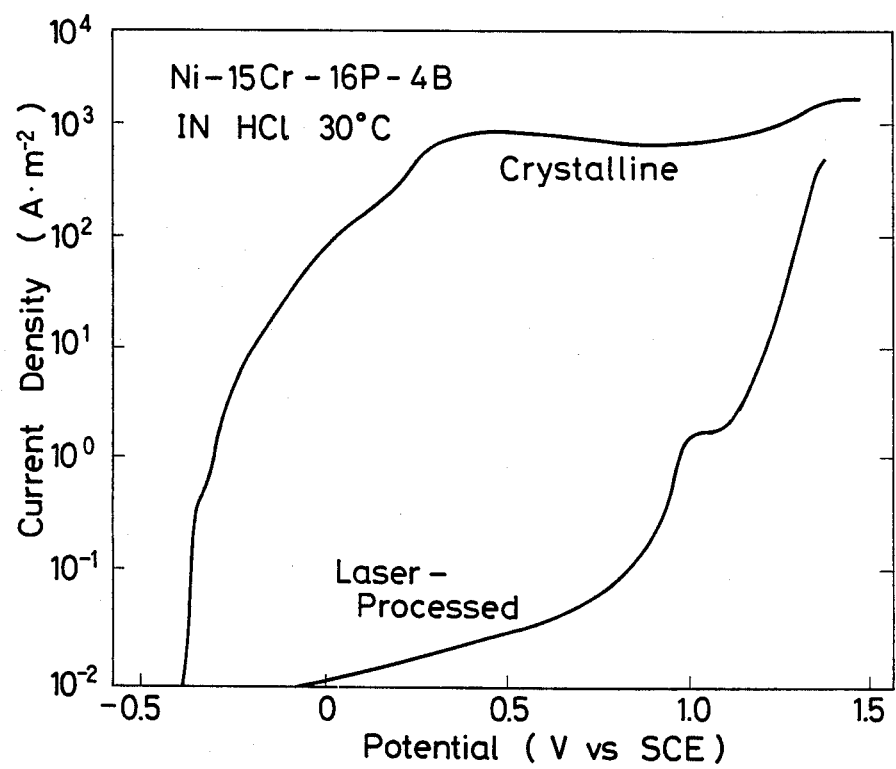
FIGS. 2 to 13 show the polarization curves of the surface alloys of the invention.

FIG. 2 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 2

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-12at % Cr-16at % P-4at % B alloy of 40 $\mu$m thickness and 6 mm width. The ribbon-shaped alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen consisting of a crystalline surface alloy bonded onto the mild steel.

The specimen was mounted on an X-Y work table reciprocating in the X-direction and was irradiated with a continuous $CO_2$ laser beam of 400 W in output and 200 $\mu$m in beam diameter. The irradiation beam density was 781.25 J/cm$^2$, and the melting time was $6.25 \times 10^{-4}$ sec. On its turn during each one-way motion in the X-direction, the specimen was moved in the Y-direction by 50 $\mu$m. A second treatment was done except for a movement of 100 $\mu$m in the Y-direction. A third treatment was made at an irradiation energy density of 694.44 J/cm$^2$ for a melting length of time of $5.56 \times 10^{-4}$ sec with a movement of 100 $\mu$m in the Y-direction, thereby obtaining an amorphous surface alloy on the mild steel substrate.

Figure 3:
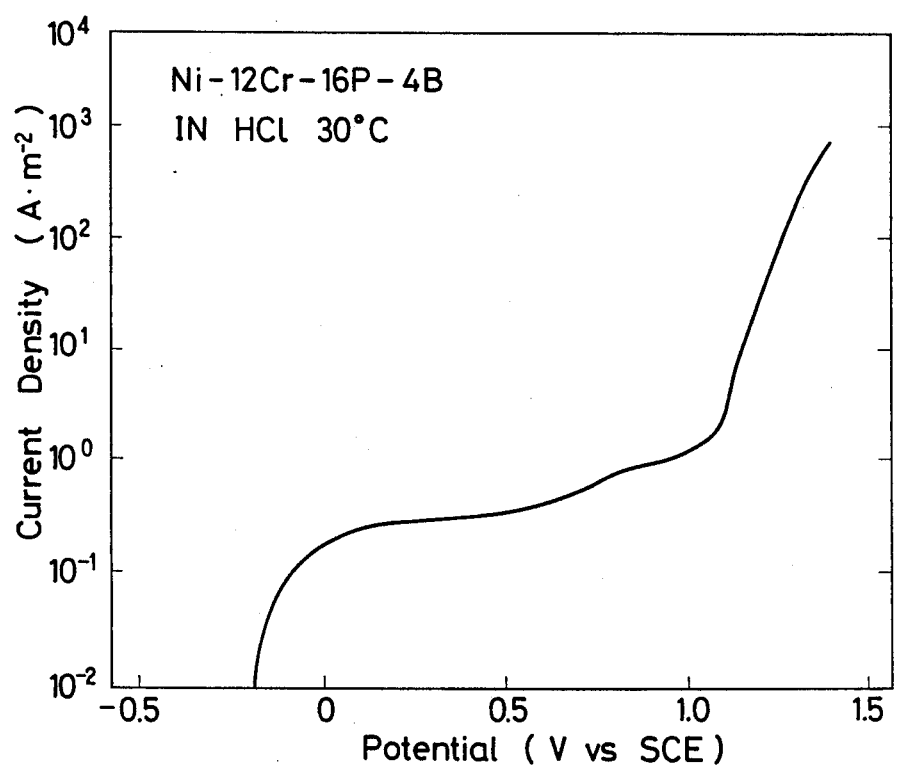

FIG. 3 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 3

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-14at % Cr-16at % P-4at % B alloy of 40 $\mu$m thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X—Y work table reciprocating in the X-direction and was irradiated with a continuous $CO_2$ laser beam of 400 W in output and 200 $\mu$m in beam diameter. The irradiation beam density was 781.25 J/cm$^2$, and the melting time was $6.25 \times 10^{-4}$ sec. On its turn during each one-way motion in the X-direction, the specimen was moved in the Y-direction by 50 $\mu$m. A second treatment was done except for a movement of 100 $\mu$m in the Y-direction. A third treatment was made at an irradiation energy density of 694.44 J/cm$^2$ for a melting time of $5.56 \times 10^{-4}$ sec with a movement of 100 μm in the Y-direction, thereby obtaining an amorphous surface alloy on the mild steel substrate.

Figure 4:
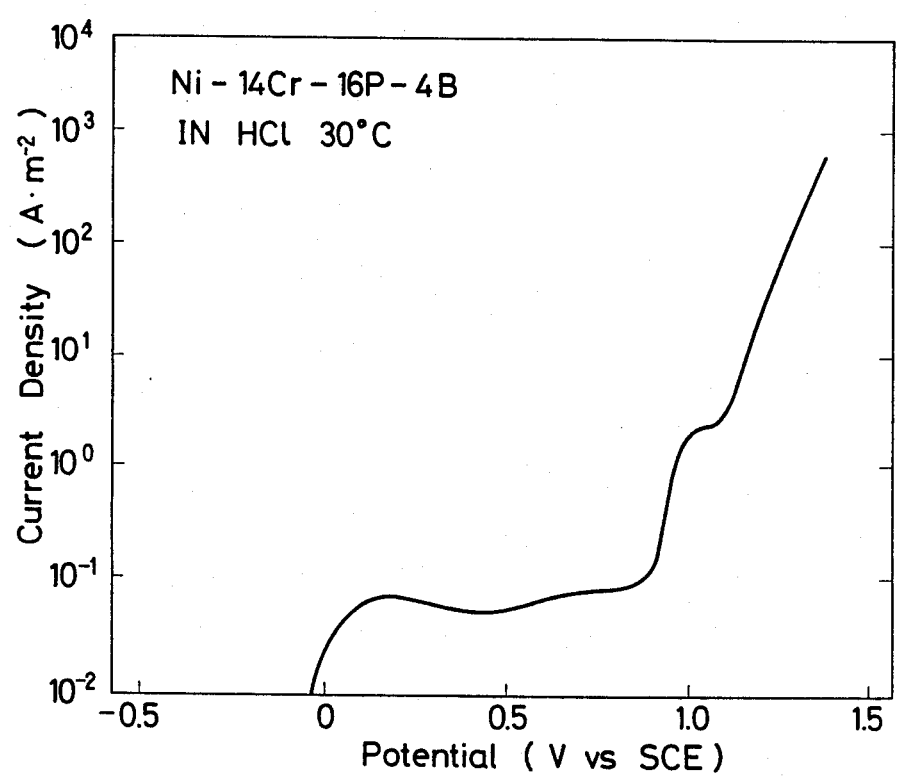

FIG. 4 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 4

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-17at % Cr-16at % P-4at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of crystalline surface alloy bonded onto the mild steel.

The specimen was mounted on an X-Y work table reciprocating in the X-direction, and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. Second and third treatments were done under the same conditions except for a movement of 125 μm in the Y-direction, thereby obtaining an amorphous surface alloy on the mild steel substrate.

Figure 5:
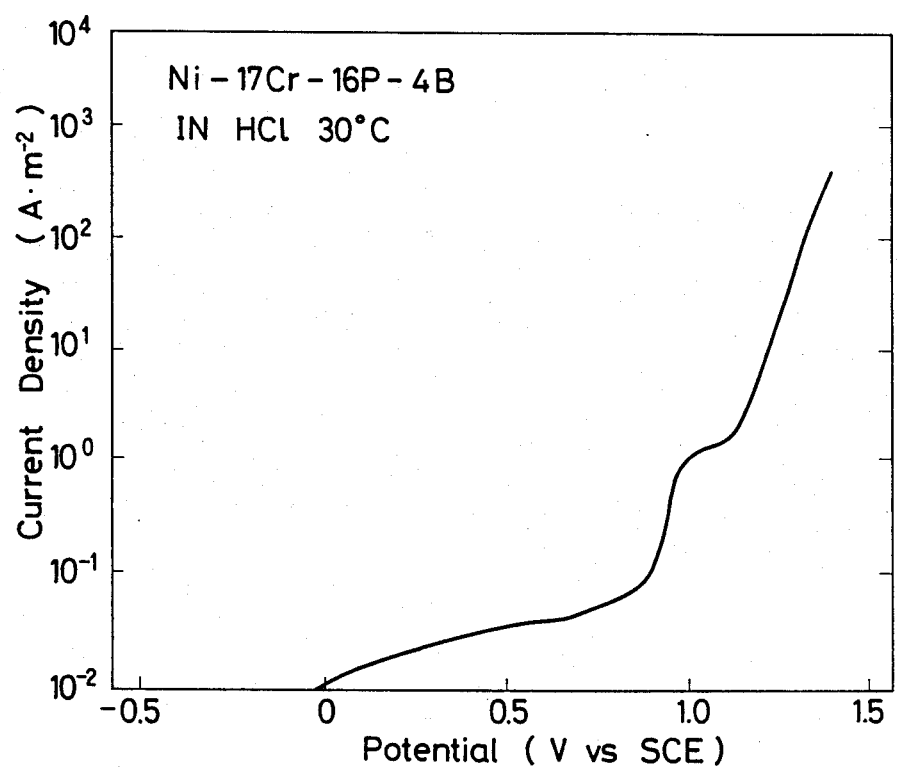

FIG. 5 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 5

Alloy ingots were prepared by induction melting of prescribed amounts of nickel phosphide, electrolytic nickel, electrolytic chromium and boron crystal in argon atmosphere. The ingots were used for the preparation of ribbon-shaped Ni-15at % Cr-14at % P-4at % B and Ni-15at % Cr-15at % P-4at % B alloys of 40 μm thickness and 6 mm width. Each of the alloys was spot-welded to a mild steel sheet substrate of 50 mm length, 10 mm width and 3.2 mm thickness. The steel sheets were heat-treated in a vacuum and quenched in a diffusion pump oil in vacuum, whereby the surface alloys were melted dissolving a portion of the substrate metal, giving a specimen to be irradiated consisting of a crystalline surface alloy bonded onto the mild steel.

The specimen was mounted on an X—Y work table reciprocating in the X-direction, and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. A second treatment was done under the same conditions except for a movement of 100 μm in the Y-direction. A third treatment was made at an energy density of 625 $J/cm^2$ for a melting time of $5 \times 10^{-4}$ sec at a movement of 100 μm in the Y-direction, thereby obtaining an amorphous surface alloy on the mild steel substrate.

Figure 6:
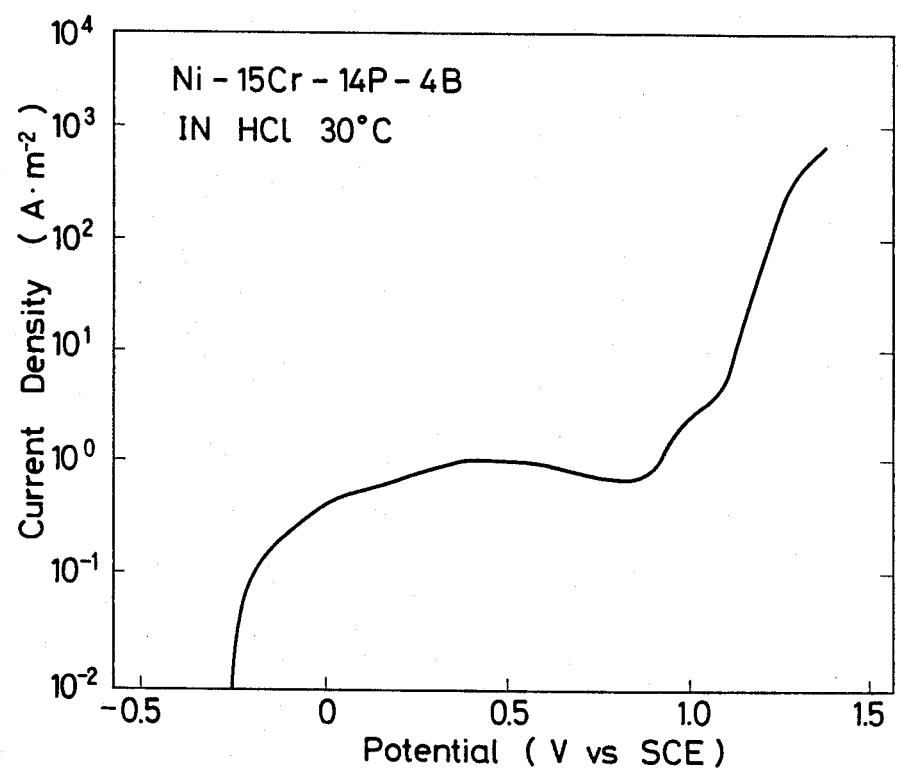

FIG. 6 shows the anodic polarization curve of this amorphous Ni—15Cr—14P—4B surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 6

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-15 at % Cr-14 at % P-6 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy on the mild steel.

The specimen was mounted on an X—Y work table reciprocating in the X-direction and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. A second treatment was done under the same conditions except for a movement of 100 μm in the Y-direction. A third treatment was made at an energy density of 694.44 $J/cm^2$ for a melting length of time of $5.56 \times 10^{-4}$ sec at a movement of 100 μm in the Y-direction, thereby obtaining an amorphous surface alloy on the mild steel substrate.

Figure 7:
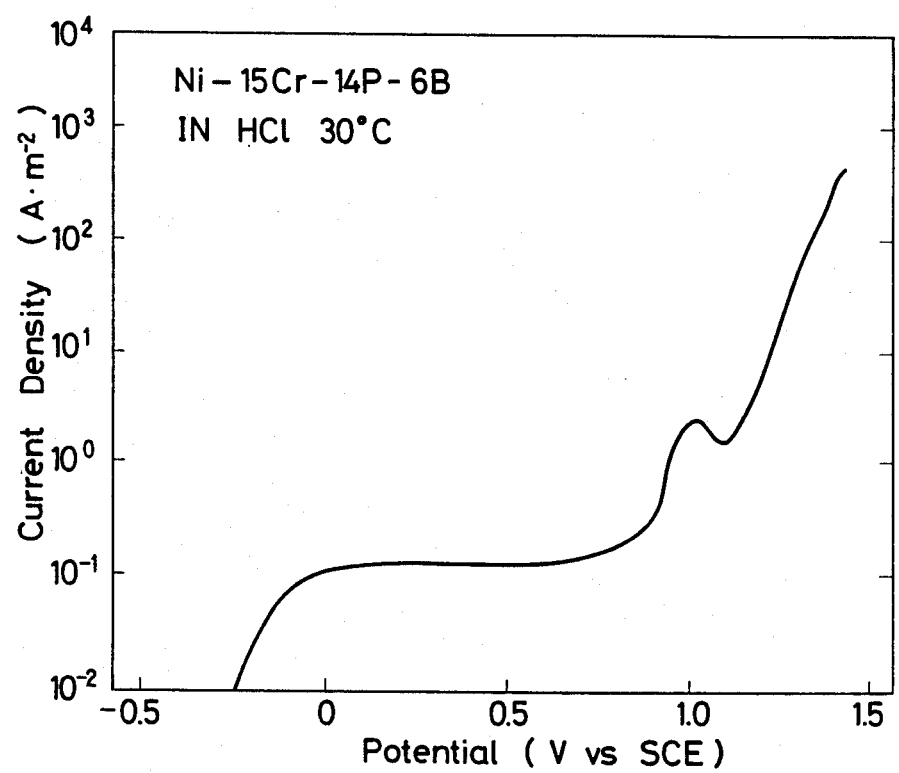

FIG. 7 shows the anodic polarization curve of this amorphous surface alloy thus prepared measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 7

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-15 at % Cr-16 at % P-3 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X—Y work table reciprocating in the X-direction, and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. Second and third treatments were done under the same conditions except for a movement of 100 μm in the Y-direction. A fourth treatment was made at an energy density of 892.86 $J/cm^2$ for a melting time of $7.14 \times 10^{-4}$ sec at a movement of 100 μm in the Y-direction, thereby obtaining an amorphous surface alloy on the mild steel substrate.

Figure 8:
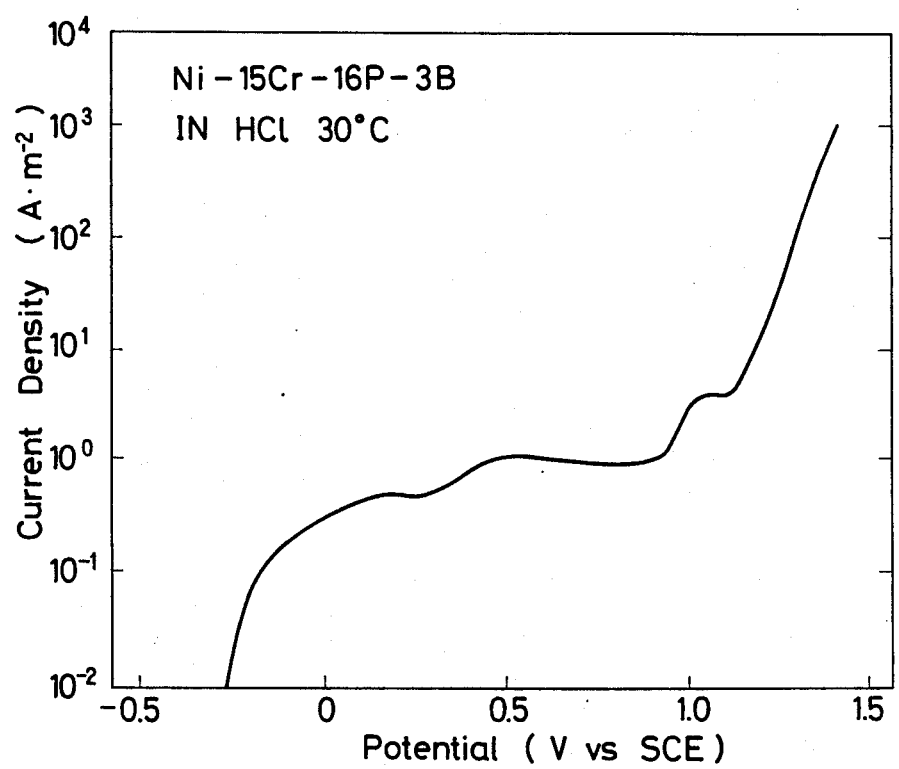

FIG. 8 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 8

An alloy ingot was prepared by induction melting of prescribed amounts of nickel phosphide, electrolytic nickel, electrolytic chromium and boron crystal in argon atmosphere. The ingot was used for the preparation of a ribbon-shaped Ni-15 at % Cr-18 at % P-2 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded on the mild steel.

The specimen was mounted on an X-Y work table reciprocating in the X-direction and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. Second and third treatments were done under the same conditions except for a movement of 100 μm in the Y-direction, thereby obtaining an amorphous surface alloy on the mild steel substrate.

Figure 9:
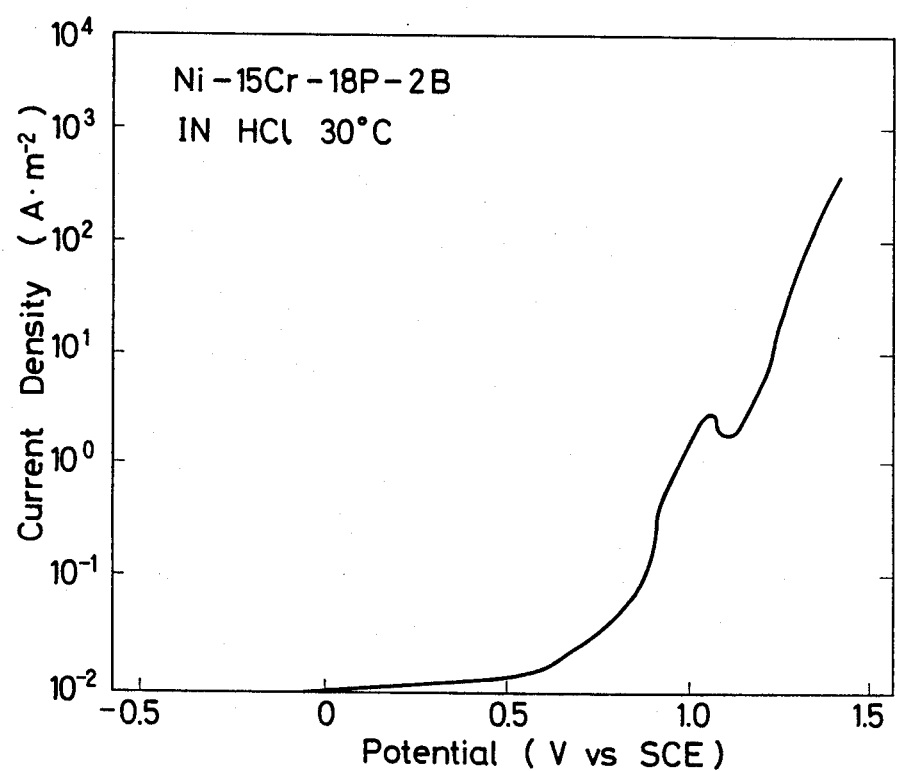

FIG. 9 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 9

Alloy ingots were prepared by induction melting of prescribed amounts of nickel phosphide, electrolytic nickel, electrolytic chromium and boron crystal in argon atmosphere. The ingots were used for the preparation of ribbon-shaped Ni-15 at % Cr-15 at % P-5 at % B and Ni-15 at % Cr-17 at % P-2 at % B alloys of 40 μm thickness and 6 mm width. Each of the alloys was spot-welded to a mild steel sheet substrate of 50 mm length, 10 mm width and 3.2 mm thickness. The steel sheets were heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X-Y work table reciprocating in the X-direction and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. Second and third treatments were done under the same conditions except for a movement of 100 μm in the Y-direction. A fourth treatment was made at an energy density of 625 $J/cm^2$ for a melting time of $5 \times 10^{-4}$ sec at a movement of 100 μm in the Y-direction, thereby obtaining an amorphous surface alloy on the mild steel substrate.

Figure 10:
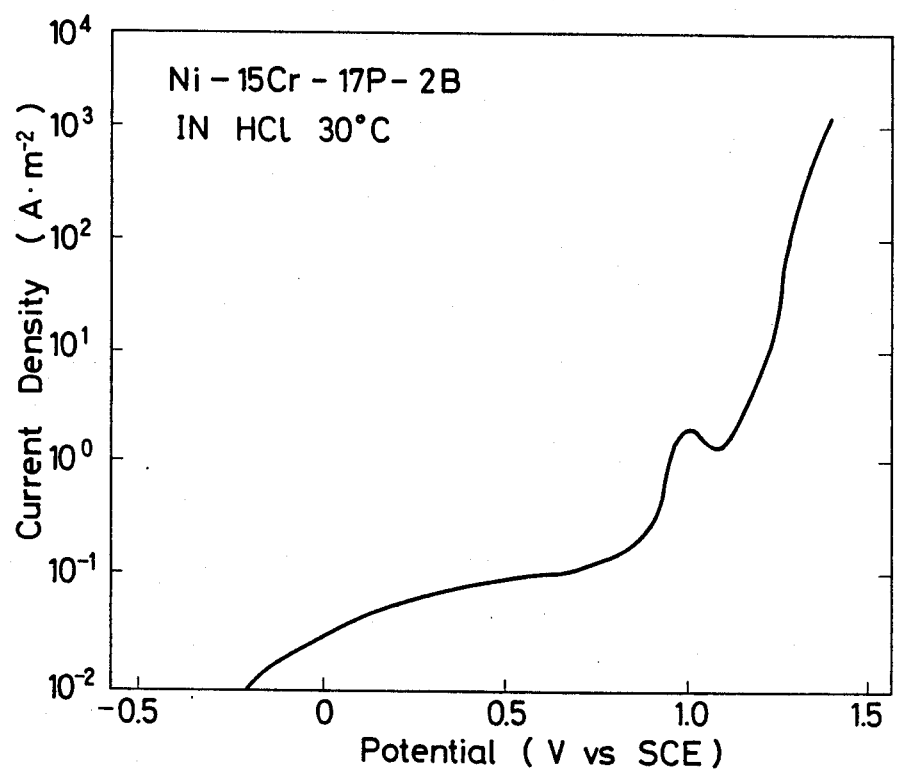

FIG. 10 shows the anodic polarization curve of this amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 10

An alloy ingot was prepared by induction melting of prescribed amounts of nickel phosphide, electrolytic nickel, electrolytic chromium, molybdenum metal and boron crystal in argon atmosphere. The ingot was used for the preparation of a ribbon-shaped Ni-10 at % Cr-5 at % Mo-16 at % P-4 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X—Y work table reciprocating in the X-direction and was irradiated with a continuous $CO_2$ laser beam of 400 W in output and 200 μm in beam diameter. The irradiation beam density was 1041.7 $J/cm^2$, and the melting time was $8.33 \times 10^{-4}$ sec. On its turn during each one-way motion in the X-direction, the specimen was moved in the Y-direction by 50 μm. A second treatment was done under the same conditions except for a movement of 100 μm in the Y-direction. A third treatment was made at an energy density of 625 $J/cm^2$ for a melting time of $5 \times 10^{-4}$ sec, thereby obtaining an amorphous surface alloy on the mild steel substrate.

Figure 11:
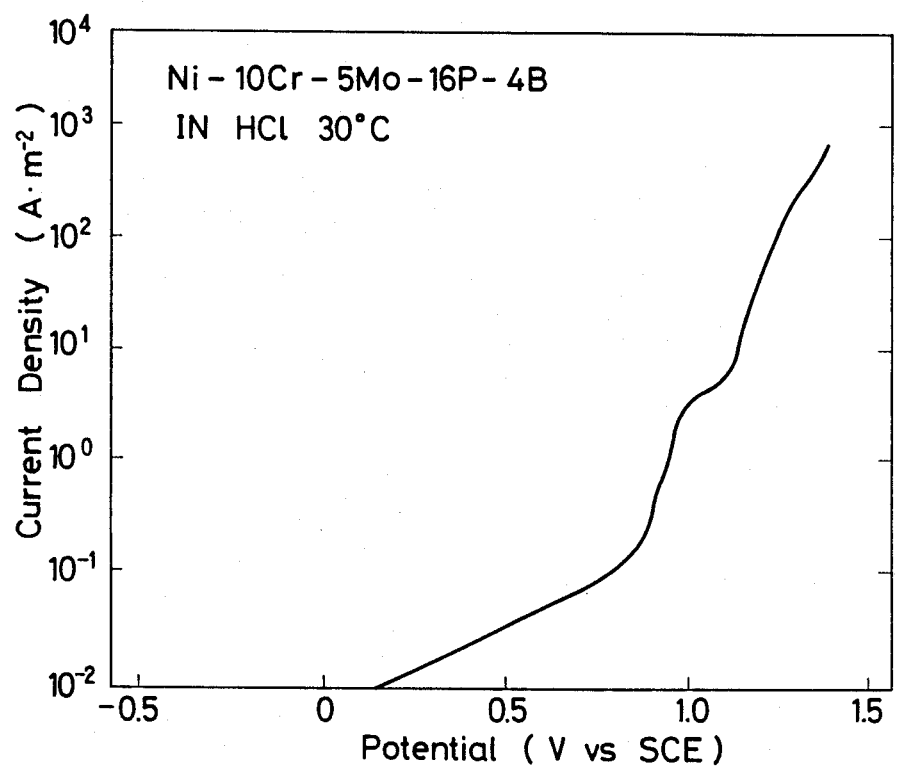

FIG. 11 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 11

A Ni-23.9 at % P alloy of 20 μm thickness and a Ni-22.2 at % B alloy of 4.55 μm thickness were electroless-deposited and Cr of 4.9 μm thickness was electrodeposited on a mild steel sheet of 70 mm length, 20 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X—Y work table reciprocating in the X-direction and was irradiated with a continuous $CO_2$ laser beam of 400 W in output and 200 μm in beam diameter. The irradiation beam density was 3135 $J/cm^2$, and the melting time was $2.5 \times 10^{-3}$ sec. On its turn during each one-way motion in the X-direction, the specimen was moved in the Y-direction by 50 μm. Two cycles of this treatment provided a surface alloy composed of a mixture of amorphous and crystalline phases. A third treatment was made at an energy density of 1041.7 $J/cm^2$ for a melting time of $8.33 \times 10^{-4}$ sec at a movement of 100 μm in the Y-direction. A fourth treatment was made at an energy density of 625 $J/cm^2$ for a melting time of $5 \times 10^{-4}$ sec at a movement of 100 μm in the Y-direction, thereby obtaining an amorphous Ni-14.8 at % Cr-16 at % P-4 at % B surface alloy on the mild steel substrate.

The anodic polarization curve of the amorphous surface alloy measured in 1N HCl solution at 30° C. was substantially the same as shown in FIG. 2, indicating extremely high corrosion resistance.

An extremely corrosion-resistant amorphous surface alloy has been found obtainable on the crystalline mild steel substrate.

EXAMPLE 12

An alloy ingot was prepared by induction melting of prescribed amounts of nickel phosphide, electrolytic nickel, electrolytic cobalt, electrolytic chromium, molybdenum metal and boron crystal in argon atmosphere. The ingot was used for the preparation of a ribbon-shaped Ni-10 at % Co-15 at % Cr-16 at % P-4 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X—Y work table reciprocating in the X-direction and was irradiated with a continuous $CO_2$ laser beam of 400 W in output and 200 μm in beam diameter. The irradiation beam density was 781.25 $J/cm^2$, and the melting time was $6.25 \times 10^{-4}$ sec. On its turn during each one-way motion in the X-direction, the specimen was moved in the Y-direction by 50 μm. Two cycles of this treatment were done and another two cycles of treatment were done under the same condition except for a movement of 100 μm in the Y-direction, thereby obtaining an amorphous surface alloy on the mild steel substrate.

Figure 12:
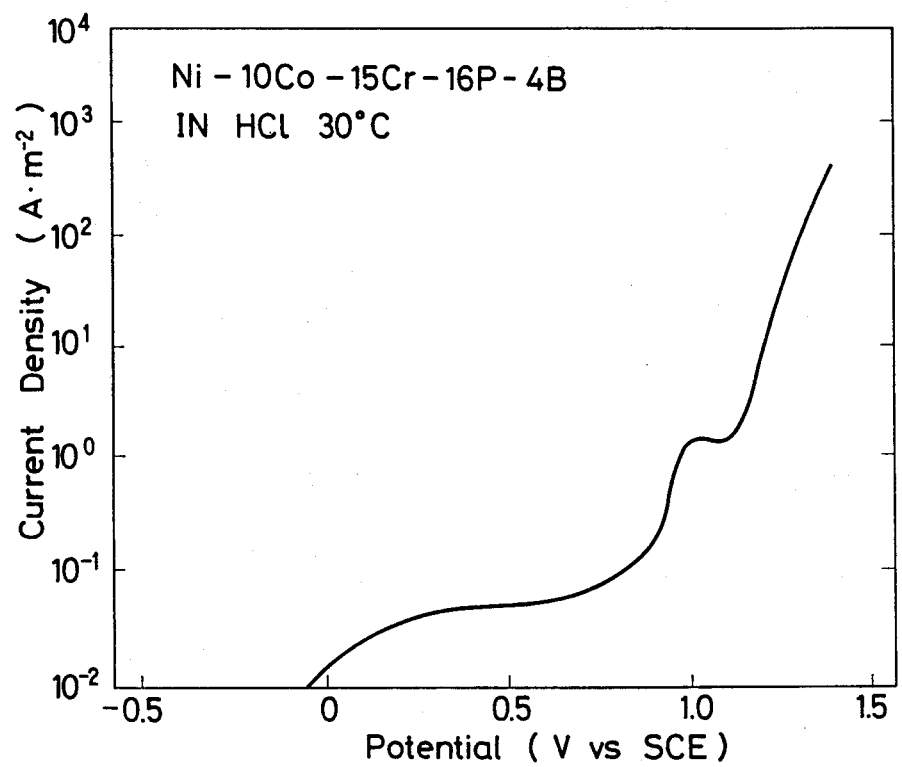

FIG. 12 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance.

An extremely corrosion-resistant amorphous surface alloy has been found obtainable on the crystalline mild steel substrate.

EXAMPLE 13

An alloy ingot was prepared by induction melting of prescribed amounts of nickel phosphide, electrolytic nickel, electrolytic iron, electrolytic chromium, and boron crystal in argon atmosphere. The ingot was used for the preparation of a ribbon-shaped Ni-10 at % Fe-15 at % Cr-16 at % P-4 at % B alloy of 40 μm thickness and 6 mm width. The alloy was spot-welded to a mild steel sheet of 50 mm length, 10 mm width and 3.2 mm thickness. The steel sheet was heat-treated in a vacuum and quenched in a diffusion pump oil in vacuum, whereby the surface alloy was melted dissolving a portion of the substrate metal, giving a specimen to be irradiated consisting of a crystalline surface alloy bonded onto the mild steel.

The specimen was mounted on an X-Y work table reciprocating in the X-direction and was irradiated with a continuous $CO_2$ laser beam of 400 W in output and 200 μm in beam diameter. The irradiation beam density was 625 $J/cm^2$, and the melting time was $5 \times 10^{-4}$ sec. On its turn during each one-way motion in the X-direction, the specimen was moved in the Y-direction by 50 μm. Two cycles of this treatment were done and another two cycles of treatment were done under the same conditions except for a movement of 100 μm in the Y-direction, thereby obtaining an amorphous surface alloy on the mild steel substrate.

Figure 13:
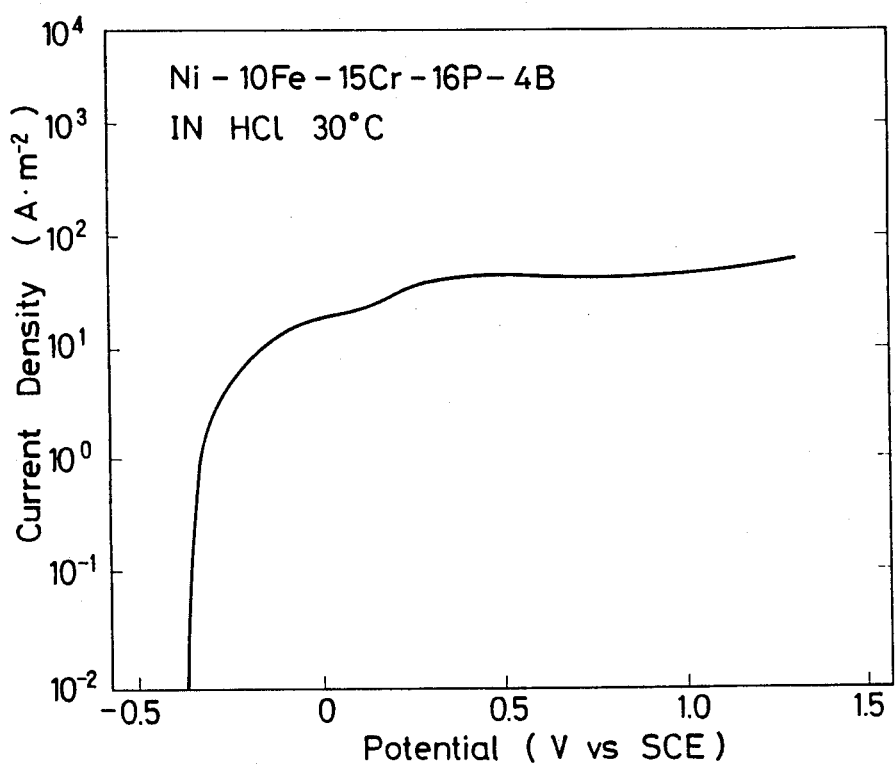

FIG. 13 shows the anodic polarization curve of the amorphous surface alloy measured in 1N HCl solution at 30° C. This alloy was spontaneously passive in a wide passive region up to the potential region of the transpassive region of chromium, indicating extremely high corrosion resistance. The amorphous surface alloys of the invention are extremely corrosion-resistant on crystalline mild steel substrates.

The corrosion-resistant amorphous surface alloys show their characteristics in very aggressive environments and can be prepared by the unique method of the invention.

The process does not require complicated or expensive operation. The surface alloys and their preparation process of the invention are suitable for practical use.

What is claimed is:

1. A corrosion resistant structure comprising:
   a crystalline metallic substrate; and
   an amorphous surface alloy intimately bonded to said substrate, said alloy consisting of 8 to 19 atomic % of Cr, 17 to 22 atomic % of the sum of P and 2 to 7 atomic % B, the balance being substantially Ni, and Ni—Co alloy containing Co in an atomic ratio of Co/Ni less than ⅔, and Ni—Fe alloy containing Fe in an atomic ration of Fe/Ni of less than 1/5, or an Ni—Fe—Co alloy containing Co in an atomic ratio of Co/Ni of less than ⅔ and containing Fe in an atomic ratio of Fe/(Ni+Co) of less than 1/5, said surface alloy being less than 150 μm thick, prepared by:

being subjected at least once to irradiation by a high energy density beam, while causing relative movement between said structure and said beam, controlling the energy density not in excess of 5000 J/cm$^2$ and a melting time not in excess of $5\times10^{-3}$ sec, the product of irradiation energy density and irradiation time being up to 5 J sec/cm$^2$, whereby said alloy is subjected to mixing and homogenizing during heating and a consequent rapid quenching from molten state.

2. A corrosion resistant structure according to claim 1 wherein said Cr is substituted with Mo up to an atomic ratio of Mo/Cr of 1.

3. A corrosion resistant structure comprising:

a crystalline metallic substrate;

an amorphous surface alloy consisting of approximately 8 to about 19 atomic % of at least one compound selected from the group consisting of Cr and Mo, approximately 17 to about 22 atomic % of P and approximately 2 to about 7 atomic % B, the balance being substantially Ni, and Ni—Co alloy containing Co in an atomic ratio of Co/Ni less than $\frac{2}{3}$, and an alloy chosen from the group consisting of an Ni—Fe alloy containing Fe in an atomic ratio of Fe/Ni of less than 1/5, and an Ni—Fe—Co alloy containing Co in an atomic ratio of Co/Ni of less than $\frac{2}{3}$ and containing Fe in an atomic ratio of Fe/(Ni+Co) of less than 1/5, said surface alloy being less than 150 μm thick; and the structure being constructed by subjecting the structure at least once to irradiation by a high energy density beam, while causing relative movement between said structure and said beam, controlling the energy density so that it is not in excess of approximately 5000 J/cm$^2$ and has a melting time not in excess of approximately $5\times10^{-3}$ sec, the product of irradiation energy density and irradiation time being up to 5 J sec/cm$^2$, the alloy being subjected to a mixing and homogenizing during heating and a rapid quenching from molten state.

4. The corrosion resistant structure of claim 3 wherein the alloy includes approximately 8 to about 18 atomic % Cr.

5. The corrosion resistant structure of claim 3 wherein the alloy includes approximately 8 to about 18 atomic % Mo.

* * * * *